S. T. DAVIS.
Bee-Hives.
No. 137,831. Patented April 15, 1873.
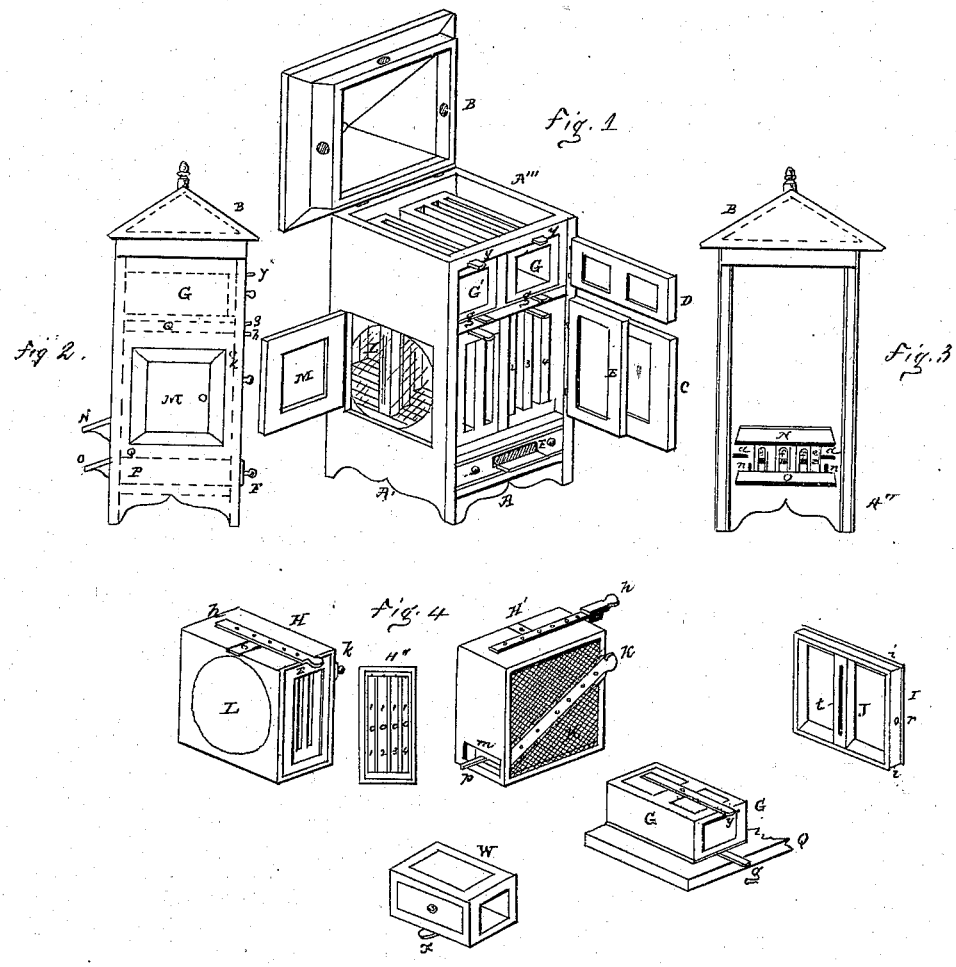

UNITED STATES PATENT OFFICE.

SAMUEL T. DAVIS, OF MILLERSVILLE, PENNSYLVANIA.

IMPROVEMENT IN BEE-HIVES.

Specification forming part of Letters Patent No. 137,831, dated April 15, 1873; application filed December 12, 1872.

*To all whom it may concern:*

Be it known that I, Dr. SAMUEL T. DAVIS, of Millersville, in the county of Lancaster and State of Pennsylvania, have invented certain Improvements in Bee-Hives, of which the following is a specification:

The improvement relates to the arrangement and manner of constructing the hive, boxes, slide-valves, &c., in their relation to each other in order to afford greater control in the management of bees with the least disturbance to them, and to facilitate dividing and transferring when inclined to swarm, or for removing the comb or honey-boxes with perfect safety without injury to the bees, and so, also, as to be open to a full inspection, together with an improved drone and moth trap.

The accompanying drawing illustrates the construction and arrangement of my hive.

Figure 1 shows two sides, in perspective, with the hinged conic top and doors open. Figs. 2, 3, 4 show different details of the hive.

This, like ordinary hives, consists of a wooden box, say sixteen by sixteen and a half inches square and two and two-thirds to three feet high, with a hinged conic top, B. The rear or door side A, Fig. 1, shows a drawer, F, below, with a central or two side windows covered with wire-gauze. One or two windows with sliding or hinged shutters may be made into the front of the drawer F. There is a door, C, shown, say, fourteen by fourteen and a half inches square, which may be paneled to close the two cases or sections of frames, H H', or which contain the sliding honey-frames I. These are provided with tongues $i$, fitting in grooves made in longitudinal strips framed into the cross-pieces above and below each section. Each case or section may contain four or more of these sliding honey-frames, separated, say, half an inch from each other. The sections H H' are closed below with wire-gauze for the discharge of *débris* and ventilation, as also the inner sides K, facing each other of each section. These are provided with a diagonal or horizontal slide-valve, $k$. The tops are closed, excepting a central longitudinal slide-valve, $h$. The outer side L of each section has a round or square glass fitted in, protected by a door, M, in the sides of the box or hive A' A'''. The front end of each section has an oblong opening, $m$, below, having a sliding door moved from the outside in a slit, $d$, Fig. 3, through which the flattened stem $p$ of the door $m$ is made to project, by which means bees can be shut in or out at pleasure from each section, aided by the sliding valves $k$. The rear of each section H H'' has a glass-framed and hinged door, E, protected by the outer door C, Fig. 1. In Fig. 3, side A'' or front, the position of the several passage-ways are shown. $f$ on each side admits the ingress and egress of the bees to the sections. This is simply provided with a vertical slide-door. The openings $e$ on each side are inclined downward, and have a trap-valve which will permit the drones to come out, but so hung as to prevent their return, as well as that of moths to enter. The openings $n\,n$ lead into the drawer F under the sections. These openings or passage-ways are also provided with a valve which permits moths or drones to enter, but prevents their return. The communication with the sections is closed by the wire bottoms and central supporting-ledge and sides of the hive. N and O simply show projecting ledges above and below said passage-ways. The honey-frames I show a central piece, J, which are provided with a long vertical open slot, giving communication in addition to the space between and in front of the frames I, as also through the perforated valves $k$, from section to section, along the entire length of said valves. There are also two honey-boxes, G, shown, one over each section, on a partition or floor, Q, in the hive. These boxes have a slide-valve, $g$, with opening corresponding with those in the bottom and upper valves $h$ in the cases or sections H H'. These boxes G have a glass in the rear end, which is protected by the upper door D, Fig. 1. They are also provided with a valve, $y$, on the top of each said honey-box. W shows a trap-box, with all its sides provided with glass save the bottom, which has also a slide-valve, $x$, and may be set over either of the honey-boxes G or sections H. The object in view is to decoy the bees into this box $w$ by opening the conic top and admitting the light and closing the valves of the honey-box below, shutting off the communication of the bees from the section beneath and opening the valves to the cage or trap-box W.

When it is desirable to take honey, by removing the boxes G, being shut off below the bees become restless, and instead of allowing them to escape they will be caged in the upper box, and when all have left the honey-box, as they soon will, it is only necessary to close the valve $g$, and, thus entrapped, they can be easily transferred to a new hive or newly-organized or weaker colony without loss of bees by death or flight, nor the least exposure to their sting. In short, by this arrangement bees can be managed at pleasure, with perfect ease, always open to inspection at all points without interfering with their labors; all intruders can be shut out, or the bees shut in partially or wholly; and for cutting out or removing honey, or when inclined to swarm, the arrangement of my sections, boxes, and valves affords facilities not heretofore combined in a bee-hive.

I am aware that sliding frames, honey-boxes, and slide-valves are variously applied and used; nor do I broadly claim such separately considered.

What I claim as my invention, and desire to secure by Letters Patent, is—

1. The arrangement, in a bee-box, of the removable sections H H', provided with top and side slide-valves $k$ $h$, sliding frames I, together with the glass side and door L E, bee-door and stem $m$ $p$, all substantially constructed and operated in the manner and for the purpose specified.

2. A bee box or hive, when it is provided in front with slits $d$ $d$ for the projecting stem $p$ of the section-doors $m$, drone-outlets $e$ $e$, and drone and moth inlets $n$ $n$ leading to the drawer $f$, with their valved passages, all arranged substantially in the manner and for the purpose described.

SAMUEL T. DAVIS.

Witnesses:
JNO. M. AMWEG,
JACOB STAUFFER.